Patented Apr. 1, 1941

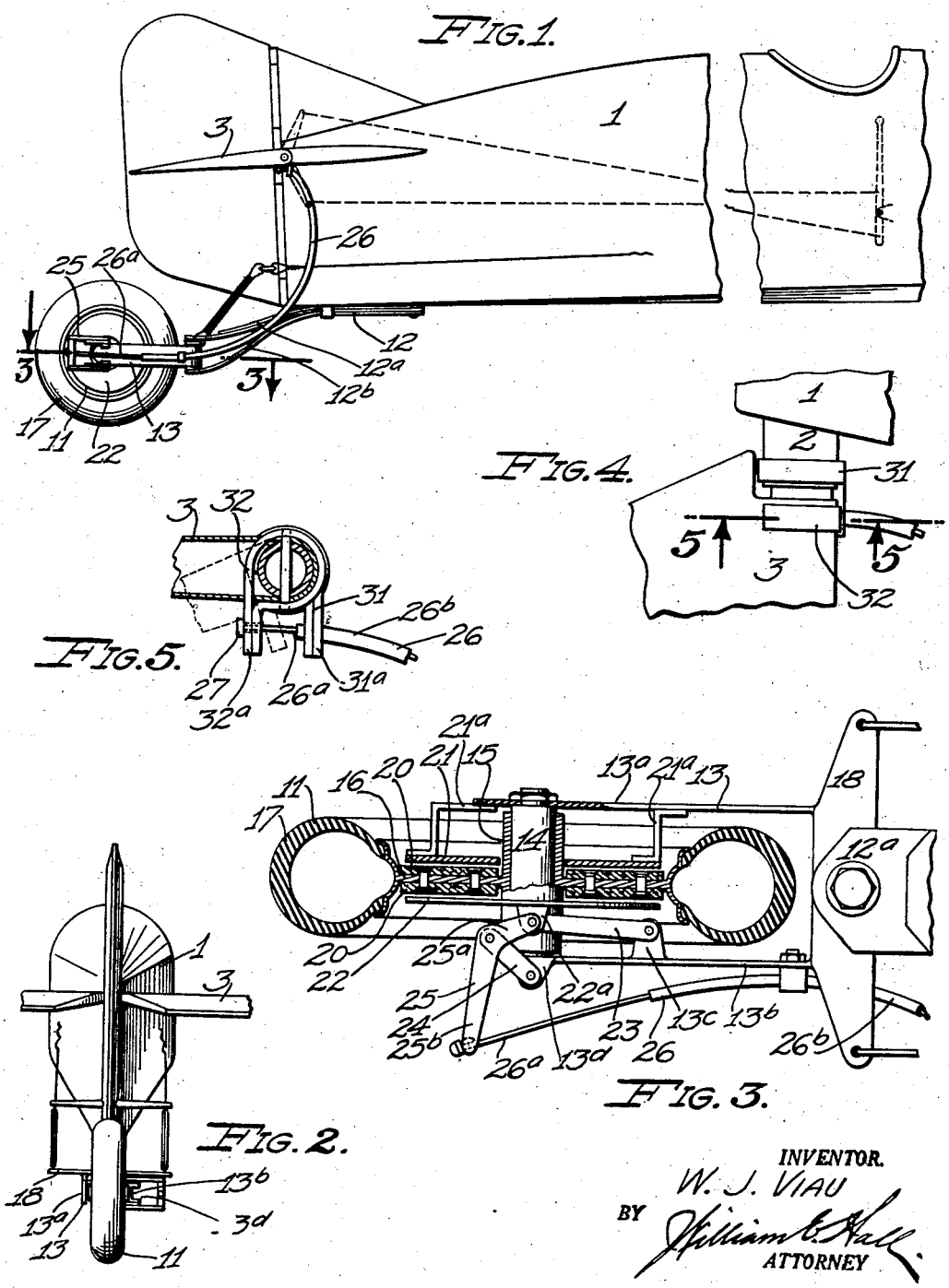

2,236,655

UNITED STATES PATENT OFFICE 2,236,655

AIRPLANE TAIL WHEEL BRAKE

Wilfred J. Viau, Culver City, Calif.

Application October 12, 1938, Serial No. 234,591

6 Claims. (Cl. 188—72)

My invention relates to an airplane tail wheel brake.

One of the principal objects of this invention is to provide an airplane tail wheel brake in which the wheel is similar in appearance to other airplane tail wheels, and although small in diameter, carries an effective brake.

An important object of this invention is the provision of a very simple brake of this class, one which is compact of construction, and one which is simple and easy to apply.

An object of this invention also is to provide a simple yieldable support for the tail wheel, and a brake which may be easily applied thereto.

A further important object of this invention is the provision of a tail wheel brake which is applied simultaneously with the raising of the elevators, so that when the airplane is taxied on the ground with the elevators raised to hold the tail down, the brake is applied.

An object also is to provide a brake of this class which may be directly connected to the elevators and operated thereby without other control means.

With these and other objects in view as will appear hereinafter, I have devised an airplane tail wheel brake having certain novel features of construction, combination, and arrangement of parts and portions, as will be hereinafter described in detail and particularly set forth in the appended claims, reference being had to the accompanying drawing and to the characters of reference thereon, which form a part of this application, in which:

Fig. 1 is a fragmentary side elevation of the rear end of an airplane embodying my invention;

Fig. 2 is a fragmentary rear view thereof;

Fig. 3 is an enlarged sectional view thereof, in plan;

Fig. 4 is a fragmentary view in plan showing the brake control in connection with the elevators of the airplane; and, Fig. 5 is a sectional view thereof, taken through 5—5 of Fig. 4.

It is customary to support the tail end of an airplane fuselage on a pivoted wheel. In the structure shown, the wheel 11 is supported at the rear end of a bifurcated cantilever arm 12. This arm consists of horizontal upper and lower leaf springs 12$^a$ and 12$^b$, which are secured together at their forward ends to the underside of the rear end of the fuselage 1, and extend backwardly and downwardly therefrom and diverge backwardly. These leaf spring furcations provide an effective spring for the tail wheel.

Between the ends of the furcations of this arm is pivotally mounted, on a vertical axis, the head end of a backwardly extending forked bracket 13. Between the rear ends of the forks is mounted the wheel 11. This wheel is mounted on a stationary spindle 14, and preferably by a tubular hub 15 which is revolubly mounted and axially shiftable thereon.

Intermediate the ends of the hub is a disc 16 upon the circumferentially outer portion of which the tire 17 of the wheel 11 is mounted.

The bracket 13 is provided at its forward portion with arms 18 which extend laterally beyond the opposite sides and are connected at their ends to the rudder bar (not shown), preferably through the rudder control means.

At the opposite sides of the wheel are provided disc shaped, that is flat ring-like brake members 21 and 22. These extend around the hub 15, the former being preferably stationary and the latter being held against rotation, but permitted to be shifted axially. To the opposite sides of the central disc 16 of the wheel are secured disc-shaped brake lining members 20 which are engaged at their outer sides by the disc brake members 21 and 22. Since the latter brake member and the wheel are axially shiftable, the wheel is gripped at the opposite sides by the two brake members, when the brake is applied.

The disc 21, as shown, is secured to the fork 13$^a$ by means of brackets 21$^a$. The disc 22 is provided at its outer side with diametrically opposed ears 22$^a$ which are spaced above and below the hub. These ears are pivotally connected at their inner sides, by links 23, to lugs 13$^c$ at the inner side of the fork 13$^b$. The fork 13$^b$ is provided with ears 13$^d$ which extend outwardly from the upper and lower edges and substantially in vertical alignment with the spindle. On these ears are pivoted links 24, the outer ends of which are pivotally connected to intermediate the ends of the brake applying arms 25. The short portions 25$^a$ of the arms 25 are pivotally connected to the ears 22$^a$. The outer ends of the longer portions 25$^b$ of said control arms are bridged together. This connecting bridge is connected intermediate its ends by the control wire 26$^a$ of the Bowden cable 26.

My brake is operated in conjunction with the elevators of the airplane because the brake on the tail wheel is applied only when the tail is on the ground, and when the tail is on the ground, the elevators are usually raised. This combination is still more desirable because the wheel is preferably forced hard against the ground or landing wheel when the elevators are raised. The brake also becomes more effective when the tail wheel is forced hard upon the ground or landing field.

In carrying out this combination, I have utilized the conventional elevator supporting bearing 2, at the rear end of the fuselage 1, and elevators 3. On the elevator supporting bearing is mounted a bracket 31 having a portion 31ª to which the tube 26ᵇ of the Bowden cable 26 is secured. To the pivoted portion of one of the elevators is secured a bracket 32 which has a depending extension 32ª positioned rearwardly from the portion 31ª. The wire 26ª extends backwardly beyond the tube 26ᵇ and loosely through the extension 32ª, and is provided at its rear end with a nut or stop 27. The other end of the tube 26ᵇ is preferably secured to the fork carrying the control arms 25. Thus, when the elevators are raised, the extension 32ª is raised, engaging the stop 27 and drawing the wire 26ª through the Bowden cable, pivoting the control arm 25 intermediate its ends, and thereby applying the brakes. As the elevators are lowered below their horizontal positions, the extension 32ª is permitted freely to tilt, as shown by dotted lines in Fig. 5, without moving the wire.

The elevators are commonly controlled by a control stick. This same control stick operates the tail wheel brake when the elevators are raised beyond predetermined positions.

Although only one of the brake members is shown as being axially shifted, such lateral shifting may be applied to both brake members, permitting thereby the wheel to be held against lateral shifting; and though I have shown and described a particular construction, combination, and arrangement of parts and portions, I do not wish to be limited to the same, but desire to include in the scope of my invention, the construction, combination, and arrangement substantially as set forth in the appended claims.

I claim:

1. An airplane wheel construction, comprising a wheel support, a wheel revolubly mounted and axially slidable thereon, a stationary brake member mounted on the support at one side of the wheel, and a manually operable and axially shiftable brake member mounted on the support at the opposite side of the wheel, and adapted, when shifted axially toward the wheel, to apply braking action simultaneously to the opposite sides of the wheel.

2. An airplane wheel construction, comprising a wheel support, a wheel revolubly mounted and axially slidable thereon, a stationary disc brake member mounted on the support at one side of and coaxially with the wheel, and a manually operable and axially shiftable disc brake member mounted on the support at the opposite side of and coaxially with the wheel, and adapted, when shifted axially toward the wheel, to apply braking action simultaneously to the opposite sides of the wheel.

3. An airplane tail wheel construction, comprising a forked support, an axle supported between the ends of the forks of the support, a wheel revolubly mounted and axially slidable on the axle and provided at its opposite sides with extended disc shaped brake surfaces, a stationary disc brake member mounted on one of the forks of the support and coaxially with the wheel, and a manually operable and axially shiftable disc brake member mounted on the support at the opposite side of and coaxially with the wheel and in association with the other fork, and adapted, when shifted axially toward the wheel, to apply braking action simultaneously to the opposite sides of the wheel.

4. An airplane tail wheel construction, comprising a forked support, an axle supported between the ends of the forks of the support, a wheel revolubly mounted and axially slidable on the axle and provided at its opposite sides with extended disc shaped brake surfaces, a stationary disc brake member mounted on one of the forks of the support and coaxially with the wheel, a manually operable and axially shiftable disc brake member mounted on the support at the opposite side of and coaxially with the wheel, and adapted, when shifted axially toward the wheel, to apply braking action simultaneously to the opposite sides of the wheel, and means on the other fork of the support for holding the shiftable brake member against rotation and transverse displacement as the same is shifted axially.

5. An airplane wheel construction comprising a wheel support, a wheel revolubly mounted and axially slidable thereon, a stationary brake member mounted on the support at one side of the wheel, and a manually operable brake means mounted on the support at the opposite side of the wheel, and adapted, when shifted axially toward the wheel, to force said wheel against the brake member.

6. An airplane wheel construction, comprising a wheel support, a wheel revolubly mounted and axially slidable thereon, a stationary disc brake member mounted on the support at one side of and coaxial with the wheel, and a manually operable brake means mounted on the support at the opposite side of the wheel, and adapted, when shifted axially toward the wheel, to force said wheel against the brake member.

WILFRED J. VIAU.